United States Patent [19]

Teagle

[11] 4,074,510
[45] Feb. 21, 1978

[54] MACHINE FOR CUTTING HEDGES, GRASS AND OTHER ARBOREAL GROWTH

[76] Inventor: William Thomas Teagle, Blackwater, Truro, England

[21] Appl. No.: 663,433

[22] Filed: Mar. 3, 1976

[51] Int. Cl.² .......................................... A01D 55/18
[52] U.S. Cl. .................................... 56/233; 56/12.7
[58] Field of Search ............................... 56/229–237, 56/249, 294, 328 R, 12.7

[56] References Cited

U.S. PATENT DOCUMENTS

| | | | |
|---|---|---|---|
| 3,087,296 | 4/1963 | Cowles | 56/10.7 |
| 3,537,245 | 11/1970 | Smith | 56/328 R |
| 3,552,107 | 1/1971 | Swift | 56/328 R |
| 3,604,188 | 9/1971 | Mott | 56/294 |
| 3,606,748 | 9/1971 | Middlesworth | 56/294 |

FOREIGN PATENT DOCUMENTS 845,643  4/1959  United Kingdom ................ 56/233

*Primary Examiner*—Russell R. Kinsey
*Attorney, Agent, or Firm*—Weingarten, Maxham & Schurgin

[57] ABSTRACT

The work-head of a tractor-mounted machine for cutting hedges, grass and other arboreal growth is pivotally mounted on the outer end of an angularly movable boom and contains a balanced rotary cutting device which is driven from the power take-off shaft of the tractor by a belt drive. Both the work-head and the boom are movable about horizontal axes parallel with the longitudinal axis of the tractor, under the control of the tractor driver.

16 Claims, 9 Drawing Figures

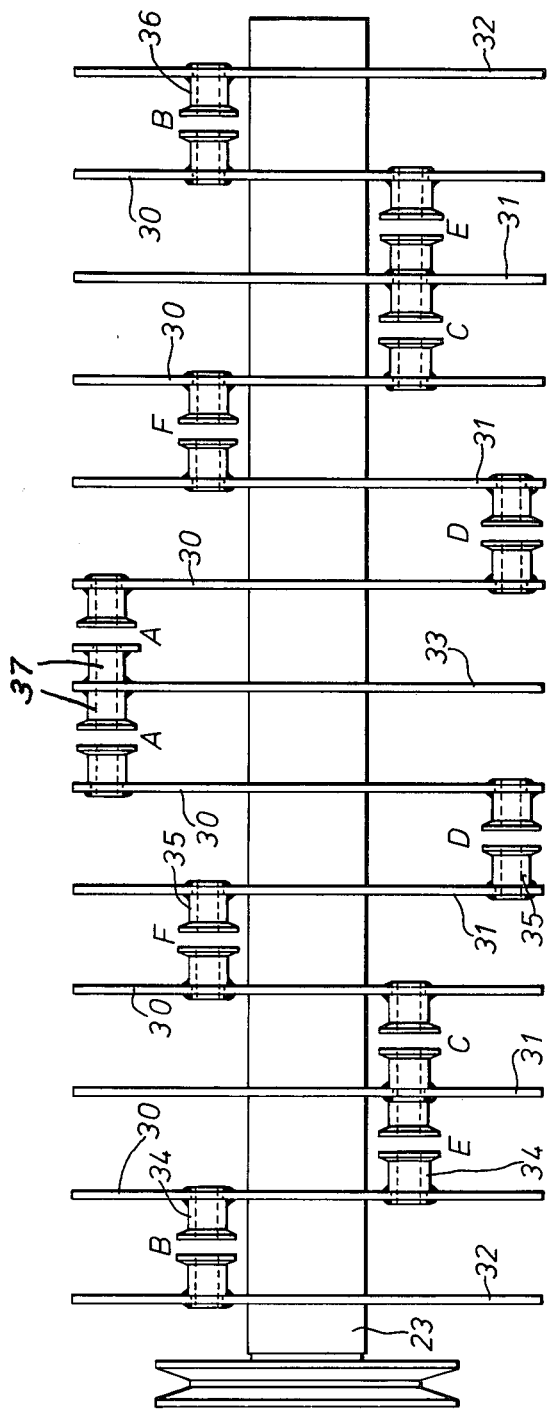
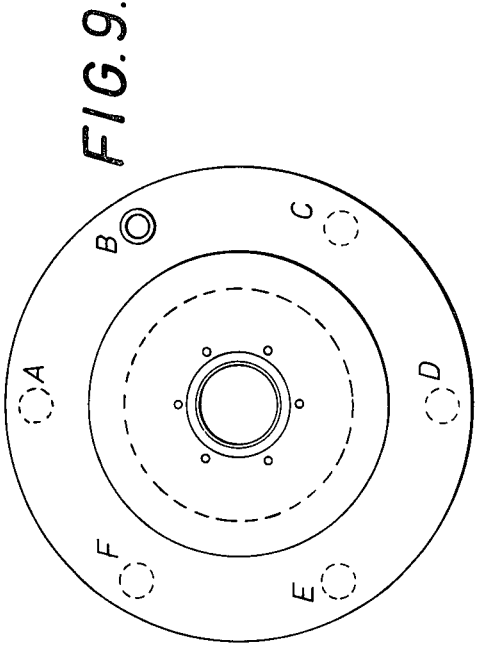
FIG. 8.
FIG. 9.

MACHINE FOR CUTTING HEDGES, GRASS AND OTHER ARBOREAL GROWTH

This invention relates to tractor-mounted agricultural or horticultural machines for cutting or trimming hedges, grass weeds, crops and other vegetable or arboreal growth.

It has already been proposed to provide a machine of this kind which comprises a supporting frame to be mounted upon a tractor and rocked about a horizontal axis parallel to the longitudinal axis of the tractor by the tractor hydraulic lift linkage, a laterally extending boom fixed at its inner end to the frame and a work-head pivotally mounted on the outer end of the boom for movement about a horizontal axis and provided with a reciprocable cutter bar which is driven from the tractor power take-off shaft through a belt drive.

It is one object of the invention to provide such a machine with an improved work-head incorporating a rotary cutter in which any out-of-balance forces occurring during operation are eliminated or considerably reduced.

It is another object of the invention to provide a more versatile machine having an increased range of operation.

It is yet another object of the invention to provide such a machine with an improved form of belt driven which will operate efficiently over a wide range of operating positions of the work-head.

With these objects in view, the present invention provides a machine for cutting or trimming hedges, grass, weeds, crops and other vegetable or arboreal growth, which machine comprises a supporting frame for mounting upon the rear end of an agricultural tractor, a laterally extending boom mounted at its inner end on said supporting frame for movement about an axis parallel to the longitudinal axis of the tractor, a work-head pivotally mounted on the outer end of said boom for movement about an axis parallel with the pivotal axis of said boom, means operable from said tractor for independently moving said boom and said work-head about their pivotal axes, a rotor mounted in said work-head and provided with a plurality of flails extending radially outward from said rotor and means for transmitting power from the tractor to said rotor, said means comprising a driving pulley on a shaft journalled in said supporting frame for operative connection to the tractor power take-off shaft, a driven pulley on said rotor and belt means operatively connecting said pulleys.

The invention will be further described, by way of example, with reference to the accompanying drawings in which:—

FIG. 8 is a diagrammatic view of yet another form of rotor in accordance with the invention; and FIG. 9 is a diagrammatic end view of the rotor shown in FIG. 8, showing the relative positions of the flail holders.

Figure 1:
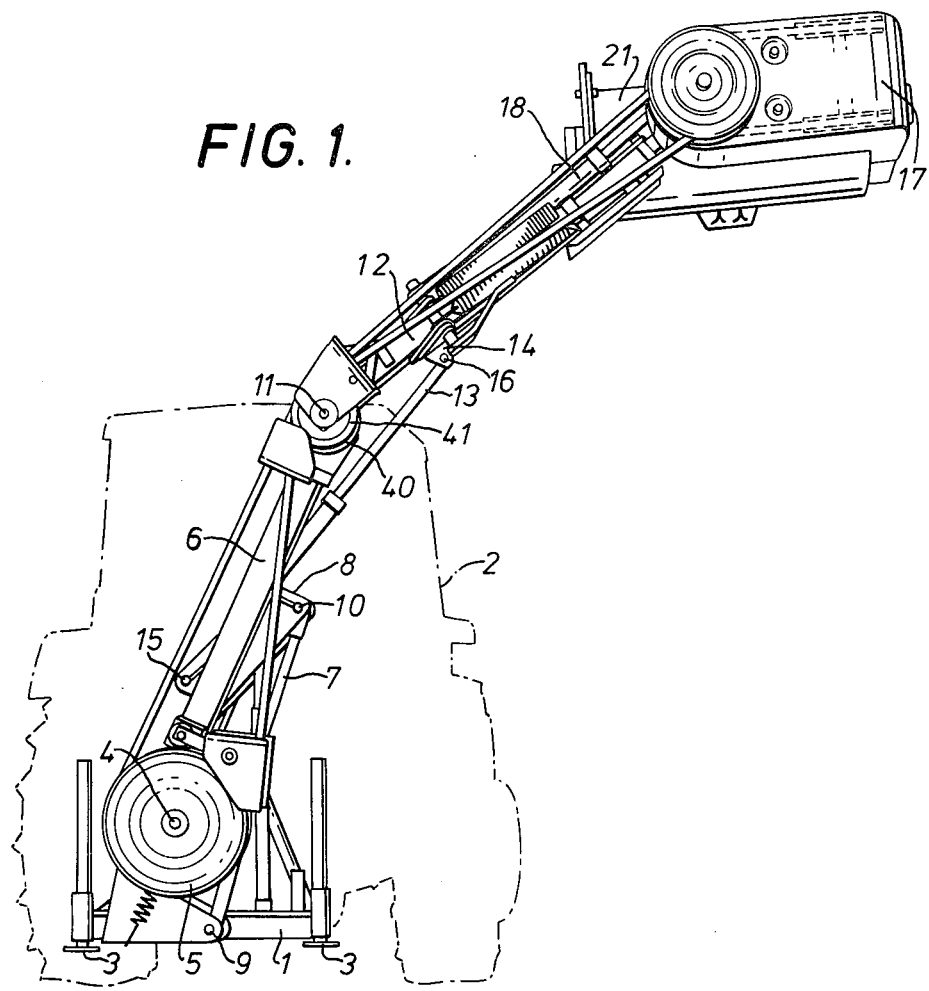
FIG. 1 is a rear elevation of one form of tractor-mounted machine in accordance with the invention.

Referring to FIG. 1 of the drawings, a supporting frame 1 is mounted on the three-point linkage at the rear of a tractor 2 and is provided with feet 3 which can be extended into engagement with the ground. A shaft 4 journalled in the frame 1 is operatively connected at its forward end to the power take-off shaft (not shown) of the tractor 2 and carries, at its rear end, a driving pulley 5. An inner boom section 6 is pivotally mounted at its inner end on the frame 1 for movement about a horizontal axis parallel to the longitudinal axis of the tractor 2 by an hydraulic ram 7 pivotally connected to the frame 1 and a bracket 8 on the boom section 6 at 9 and 10 respectively. The outer end of the boom section 6 is pivotally connected at 11 to the inner end of an outer boom section 12 which is movable about a horizontal axis relative to the boom section 6 by the operation of a ram 13 pivotally connected to the bracket 8 and to a bracket 14 on the boom section 12 at 15 and 16 respectively. A work-head 17 is pivotally mounted on the outer end of the boom section 12 for movement about a horizontal axis by a ram 18 operating between the boom section 12 and the work-head. The rams 7, 13 and 18 are selectively supplied with operating fluid from the tractor 2 through flexible hoses (not shown) under the control of a valve (not shown) operable by the tractor-driver.

Figure 2:
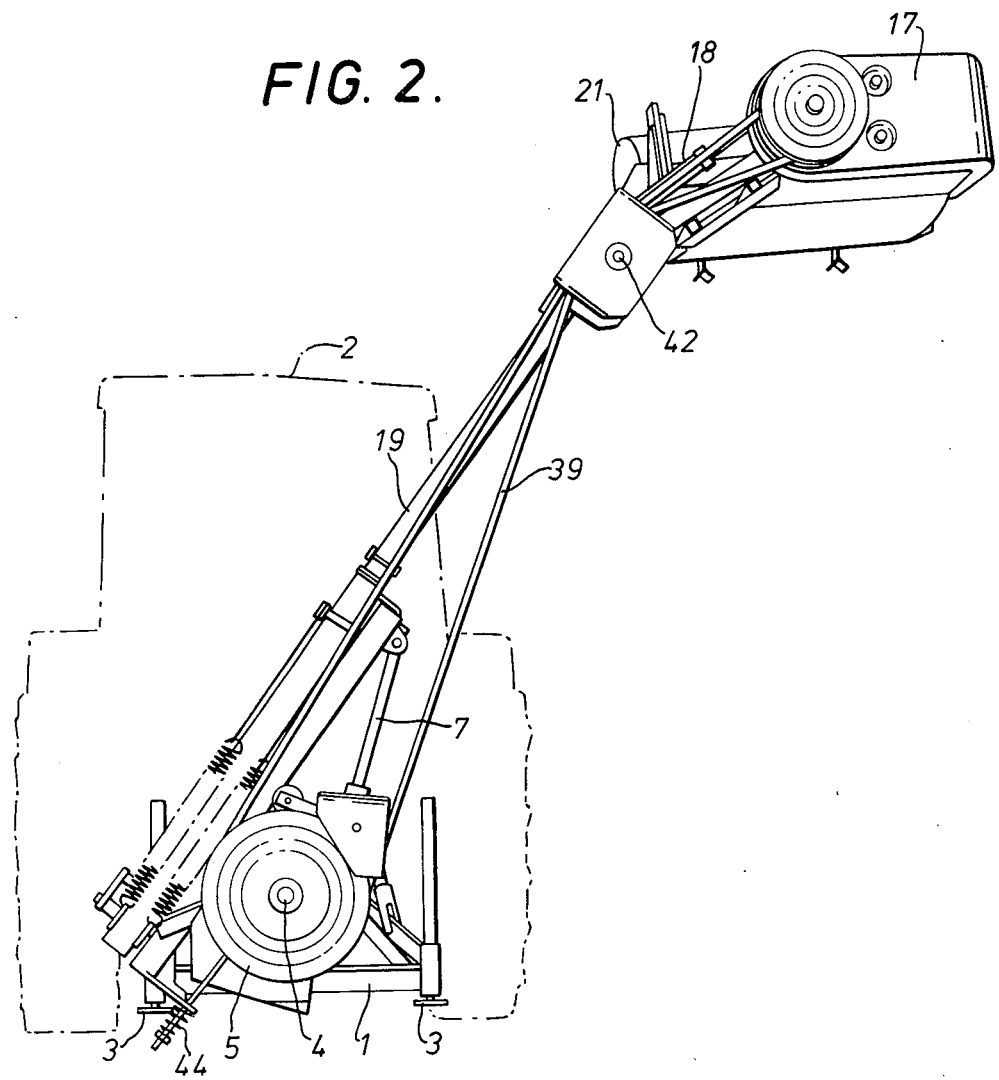
FIG. 2 is a rear elevation of another form of tractor-mounted machine in accordance with the invention.

In the machine shown in FIG. 2, the pivoted boom sections 6 and 12 are replaced by two parallel boom sections, one of which, (not shown) is slidable longitudinally relative to the other boom section 19 by the operation of the ram 7 to vary the distance of the work-head 17 from the tractor 2 and is capable of being clamped to the section 19 in any of its positions of adjustment. Adjustment can be effected with the boom extending substantially horizontally and the outer end of the work-head 17 resting on the ground, by using the hydraulic rams 7 and 18 to operate the work-head as a walking lever.

Figure 6:
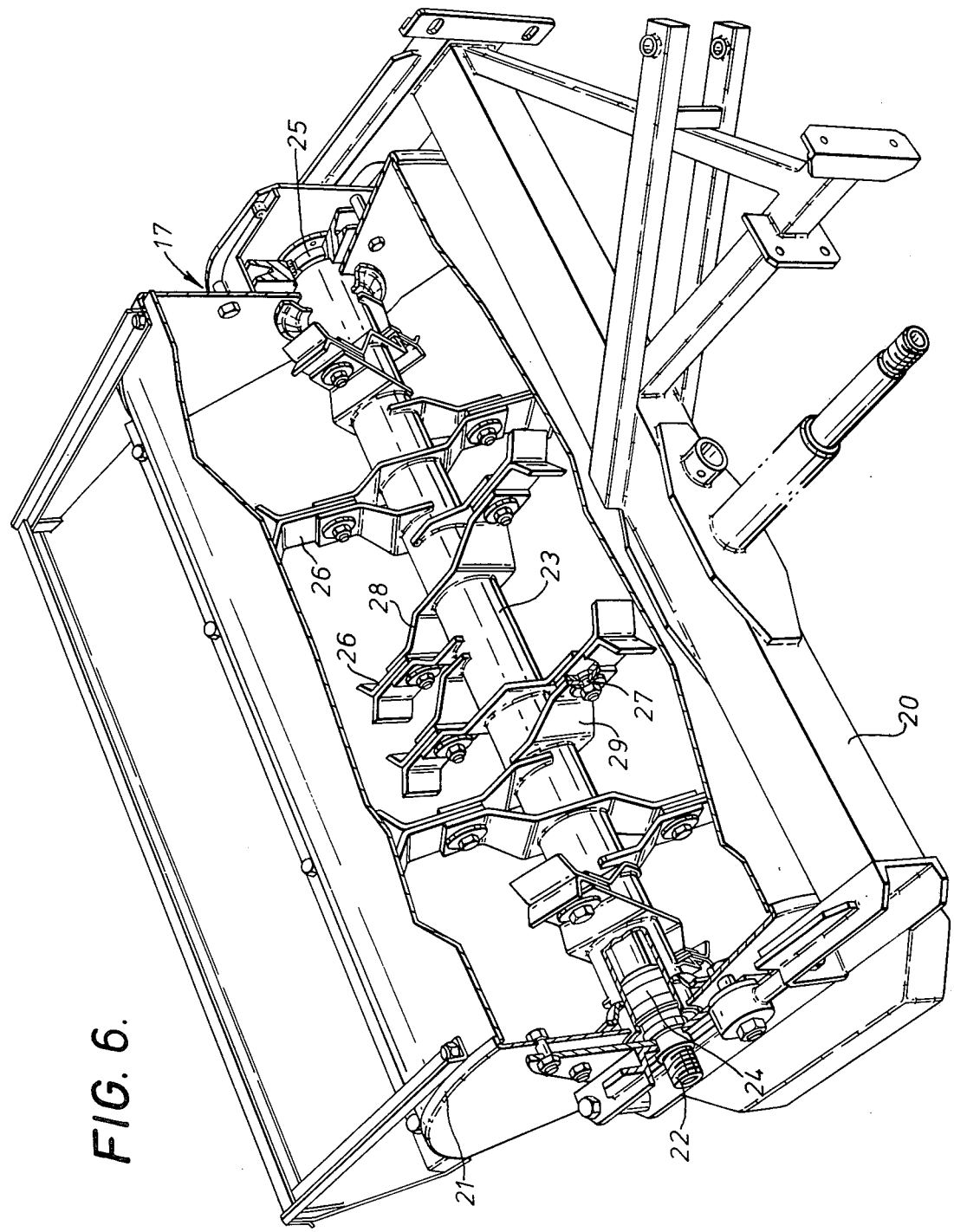
FIG. 6 is a further perspective view of the work-head of FIGS. 1 and 2, with parts broken away to show one form of a rotor in accordance with the invention.

The work-head 17 shown in FIGS. 1 and 2, comprises a substantially oblong frame 20 (FIG. 6) having its longer dimension at right angles to the pivotal axis of the work-head and covered on one side by a semi-circular guard 21. Within the frame 20 is a rotor comprising a stationary shaft 22 extending at right-angles to the pivotal axis of the work-head 17 and secured to the ends of the frame, and a cylindrical sleeve 23 rotatable on the shaft through the medium of a ball-bearing 24 at one end for properly locating the rotor and a roller bearing 25 at the other end to allow for any axial movement due to physical exertion, thermal expansion or other causes. By locating the bearings 24 and 25 within the sleeve 23 it is possible to protect them from the ingress of dirt or other matter which might tend to become wound on the shaft 22. Flails 26 are pivotally mounted on hardened bushes 27 carried by pairs of arms 28 and 29 extending radially from the surface of the rotor sleeve 23. Each flail 26 is paired with another flail 26 which is located diametrically opposite thereto but offset axially therefrom, with the arm 28 associated with each pair of flails extending on opposite sides of the sleeve 23 to support the bushes 27 for each pair of flails.

Figure 7:
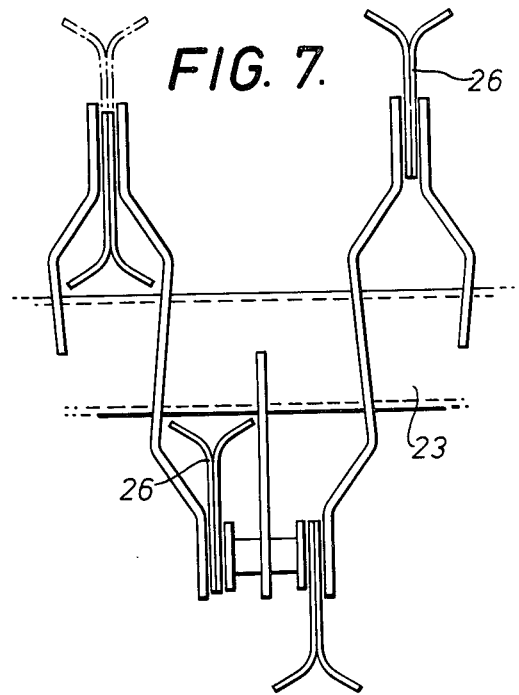
FIG. 7 is an elevational view of part of a further form of rotor in accordance with the invention.

In the modification shown in FIG. 7 the dimensions of the flails 26 and the distance of the bushes 27 from the sleeve 23 are such that the flails are able to rotate through 360° should they encounter any heavy obstacle.

In the modified form of rotor shown in FIGS. 8 and 9 the arms 28, 29 are replaced by discs 30-33 which are uniformly spaced along the rotor sleeve 23. Each disc 30 has two diametrically opposite flail holders 34 welded to opposite sides thereof adjacent its periphery, each disc 31 has two flail holders 35 welded to opposite sides thereof adjacent its periphery and circumferentially spaced from each other by 120°, each of the discs 32 located at opposite ends of the rotor has a single flail holder 36 welded thereto adjacent its periphery and the disc 33 located at the centre of the rotor has two holders 37 welded to opposite sides thereof adjacent its periphery and in register with each other. Each flail holder is bored to receive one end of one of the bushes 27 and registering flail holders cooperate to confine a flail 26 on its bush. The actual flails 26 are not shown in FIG. 8, but are represented by the reference letters A to F, the relative positions of which on the rotor are shown in FIG. 9.

The rotor constuctions shown in FIGS. 7 to 9 provide static and dynamic balance and reduce any out-of-balance couple occurring during operation to a minimum as compared with constructions involving rows of flails wherein the retardation of one row over a small arc while actually cutting would produce an out-of-balance force.

Figure 5:
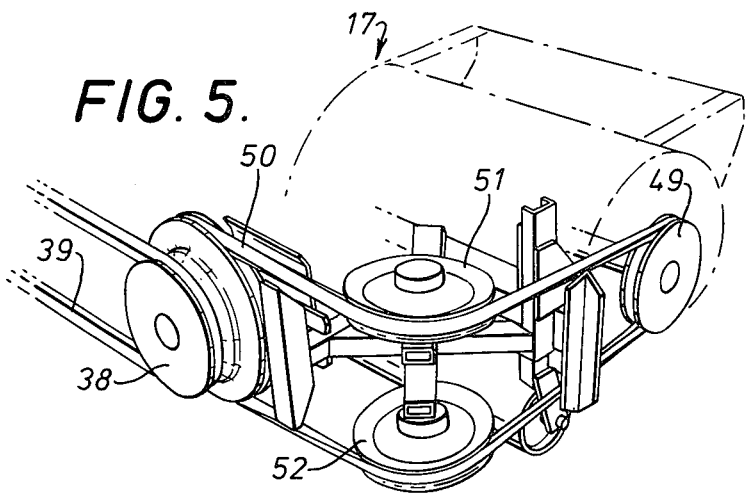
FIG. 5 is a perspective view of the work-head of FIGS. 1 and 2, with parts broken away to show the secondary drive to the rotor.
Figure 4:
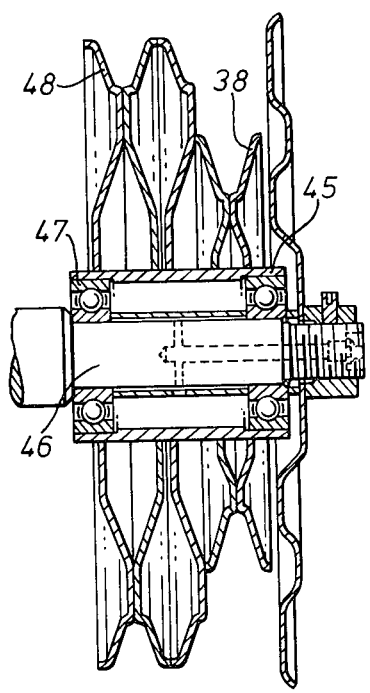
FIG. 4 is a vertical section through the driven pulley of the primary drive and the driving pulley of the secondary drive of the machines shown in FIGS. 1 and 2.
Figure 3:
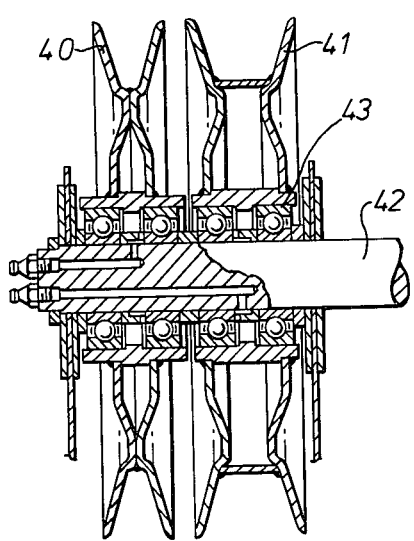
FIG. 3 is a vertical section through a pair of intermediate idler pulleys incorporated in the primary drive from the tractor to the work-head of the machines shown in FIGS. 1 and 2.

The drive from the power take-off shaft of the tractor 2 to the rotor in the work-head 17 is carried out in two stages. In the first stage the driving pulley 5 on the shaft 4 drives a pulley 38 (FIG. 5) on the work-head 17 through the medium of a vee-belt 39 which, on its outward run, passes over an intermediate idler pulley 40 (FIG. 3) and on its return run passes over an intermediate idler pulley 41. The pulleys 40 and 41 are rotatably mounted on a stationary shaft 42 through the medium of bearings 43. In the embodiment shown in FIG. 1 the shaft 42 is mounted at the junction of boom sections 6 and 12 and may form the pivot for these sections, whereas in the embodiment shown in FIG. 2 the shaft 42 is mounted at the upper end of the longitudinally slidable boom section. The vee belt 39 is tensioned by a conventional tensioning device shown at 44 and this tension is maintained by the pulleys 40 and 41 which also serve to keep the upper reaches of the belt away from the hedge or other object being cut. The pulley 38 is fixed to a sleeve 45 (FIG. 4) which is rotatable about a stub-shaft 46 on the work-head 17 through the medium of bearings 47 and has fixed thereto a second pulley 48 of greater diameter than the pulley 38. The pulley 48 constitutes the driving pulley of the second drive stage and is operable to drive a pulley 49 on the sleeve 23 of the rotor through the medium of a vee-belt 50 (FIG. 5) which, on its outward run, passes around an idler pulley 51 and on its return run, passes around an idler pulley 52, said pulleys 51 and 52 being mounted one above the other for rotation about a substantially vertical axis in one corner of the work-head 17.

I claim:

1. A machine for cutting or trimming hedges, grass, weeds, crops and other vegetable or arboreal growth, said machine comprising:
    a supporting frame for mounting upon the rear end of an agricultural tractor, said tractor having a power take-off shaft;
    a shaft journaled in said supporting frame for operative connection to said power take-off shaft;
    a laterally extending boom mounted at its inner end on said supporting frame for pivotal movement about an axis parallel to the longitudinal axis of said tractor;
    a work-head pivotally mounted on the outer end of said boom for movement about an axis parallel with said pivotal axis of said boom;
    means operable from said tractor for independently moving said boom and said work-head about their pivotal axes;
    a rotor mounted in said work-head;
    a plurality of flails extending radially outwardly from said rotor;
    a driving pulley mounted on said shaft;
    a first driven pulley rotatably mounted on said work-head;
    a primary belt drivingly coupling said driving pulley and said first driven pulley;
    a second driving pulley rotatably mounted on said work-head and rotatable with said first driven pulley;
    a second driven pulley coaxial with and mounted to said rotor; and
    a secondary belt drivingly coupling said second driving pulley to said second driven pulley, whereby said primary and secondary belts serve to transmit power from said tractor to said rotor.

2. A machine according to claim 1 and further comprising:
    a hydraulic ram coupled between said supporting frame and said boom; and
    means for supplying operating fluid to said hydraulic ram from said tractor under control of the tractor operator;
    said boom being pivotably mounted to said supporting frame, the motion of said boom about its pivotable axis being controlled by said hydraulic ram.

3. A machine according to claim 1 wherein said rotor comprises:
    a cylindrical hub; and
    a plurality of supports radiating from said hub;
    said flails being mounted at the outer ends of said supports, each of said flails being paired with another of said flails which is located diametrically opposite thereto but offset axially therefrom.

4. A machine according to claim 3 wherein pairs of said supports extend radially from the surface of said rotor hub, each pair of said supports carrying a hardened bush on which one of said flails is pivotally mounted.

5. A machine according to claim 4 wherein said flails are so mounted on said bushes as to be rotatable through 360°.

6. A machine according to claim 4, wherein said supports comprise arms of which one arm of each pair extends on opposite sides of the rotor hub and combines with two shorter arms on opposite sides thereof to support the bushes for a balanced pair of said flails.

7. A machine according to claim 6, wherein said supports comprise axially spaced discs mounted at their centres on said rotor hub, adjacent pairs of said discs being provided with registering holders for a flail-supporting bush.

8. A machine according to claim 1, wherein said primary belt drive includes two idler pulleys mounted on said boom for rotation about a common horizontal axis intermediate said first driving and driven pulleys and said driving belt passes over one of said idler pulleys on its outer run from the first driving pulley to the first driven pulley and passes over the other of said idler pulleys on its return run to the first driving pulley.

9. A machine according to claim 1, wherein said second driving pulley is of greater diameter than said first driven pulley and rotatable therewith about a horizontal axis at right angles to the axis of said rotor.

10. A machine according to claim 9, wherein said secondary belt drive includes two idler pulleys rotatable in one corner of the work-head about a common vertical axis intermediate said second driving and driven pulleys and the secondary driving belt passes around one of said pulleys on its way to said second driven pulley on the rotor and around the other of said pulleys on its return to said second driving pulley.

11. A machine according to claim 1, wherein said boom is of articulated form and comprises an inner section mounted at its inner end on said supporting frame and an outer section which carries said workhead at its outer end and is pivotally connected at its inner end to the outer end of said inner section for movement about an axis parallel to the longitudinal axis of the tractor by an hydraulic ram acting between said sections an supplied with operating liquid from the tractor under the control of the tractor driver.

12. A machine according to claim 1, wherein said boom comprises two parallel sections one of which is mounted at its inner end on said supporting frame and the other of which carries said work-head at its outer end and is slidable longitudinally relative to said one section, and means is provided for clamping said sections together in any position of adjustment of said slidable section.

13. A machine according to claim 1, wherein said work-head is movable about its pivotal axis by an hydraulic ram acting between said boom and said work-head and supplied with operating liquid from the tractor under the control of the tractor driver.

14. A machine according to claim 1, wherein said work-head comprises a substantially oblong frame having its longer dimension at right angles to the pivotal axis of the work-head and covered on one side by a semi-circular guard.

15. A machine according to claim 1, wherein said rotor comprises a stationary shaft extending at right angles to the pivotal axis of the work-head and secured in the ends of the work-head and a cylindrical sleeve constituting said hub rotatably surrounding the shaft and provided at one end with said driven pulley.

16. A machine according to claim 15, wherein bearings are interposed between said shaft and said sleeve at opposite ends of said rotor, said bearings comprising a roller bearing at the end provided with said driven pulley and a ball bearing at the opposite end.

* * * * *